(12) United States Patent
Hook et al.

(10) Patent No.: US 7,826,834 B2
(45) Date of Patent: Nov. 2, 2010

(54) METHOD FOR DOWNLOADING SOFTWARE

(75) Inventors: Michael Hook, Chandlers Ford (GB); Walter Tuttlebee, Romsey (GB); John Cundall, Ringwood (GB)

(73) Assignee: Roke Manor Research Limited, Romsey (GB)

( * ) Notice: Subject to any disclaimer, the term of this patent is extended or adjusted under 35 U.S.C. 154(b) by 618 days.

(21) Appl. No.: 09/959,496

(22) PCT Filed: Feb. 16, 2001

(86) PCT No.: PCT/GB00/00522

§ 371 (c)(1),
(2), (4) Date: Feb. 8, 2002

(87) PCT Pub. No.: WO00/65855

PCT Pub. Date: Nov. 2, 2000

(65) Prior Publication Data

US 2002/0160752 A1      Oct. 31, 2002

(30) Foreign Application Priority Data

Apr. 27, 1999   (GB) ................................. 9909617.4

(51) Int. Cl.
*H04M 3/00* (2006.01)
*G06F 9/44* (2006.01)
*G06F 9/45* (2006.01)
*H04M 11/00* (2006.01)

(52) U.S. Cl. ........................ 455/420; 455/408; 455/411; 455/414.3; 455/556.1; 717/173; 717/178

(58) Field of Classification Search ......... 455/418–420, 455/414, 408, 411, 414.3, 556.1; 364/514; 709/232; 717/168, 173, 178; *H04Q 7/32*
See application file for complete search history.

(56) References Cited

U.S. PATENT DOCUMENTS 5,247,575 A      9/1993   Sprague et al.

(Continued)

FOREIGN PATENT DOCUMENTS

EP      0804046      * 10/1977

(Continued)

OTHER PUBLICATIONS

Iaian Duncumb, et al., "Security", System Function Specification, Dec. 12, 1998, pp. 1-47.

(Continued)

*Primary Examiner*—Fan Tsang
*Assistant Examiner*—Lisa Hashem
(74) *Attorney, Agent, or Firm*—Crowell & Moring LLP

(57) ABSTRACT

In a method for downloading software from a mobile network operator to a mobile phone user, the downloaded software can be new network services or user specified applications software or user specified information, written as Java classes capable of running on a Java Virtual Machine. All the Java classes can be continuously broadcast at a relatively modest data rate. In an enhanced mode a list of services available for downloading is broadcast over the network more frequently then the actual services themselves. The user then selects which service he wants, and only that one is downloaded. Payment can be 100 on a subscription or pay-per-use basis. The method could also be adapted to work with one of the new digital broadcasting platforms such as DAB or DVB as a means for delivering the Java classes.

16 Claims, 1 Drawing Sheet

U.S. PATENT DOCUMENTS

| | | | |
|---|---|---|---|
| 5,485,577 A | | 1/1996 | Eyer et al. |
| 5,557,541 A | * | 9/1996 | Schulhof et al. ............... 700/94 |
| 5,625,690 A | | 4/1997 | Michel et al. |
| 5,761,618 A | * | 6/1998 | Lynch et al. ................. 455/419 |
| 5,794,142 A | * | 8/1998 | Vanttila et al. ............... 455/419 |
| 5,887,254 A | * | 3/1999 | Halonen ....................... 455/419 |
| 5,915,214 A | * | 6/1999 | Reece et al. .................. 455/406 |
| 6,047,327 A | * | 4/2000 | Tso et al. ..................... 709/232 |
| 6,052,600 A | * | 4/2000 | Fette et al. ................... 455/509 |
| 6,122,263 A | * | 9/2000 | Dahlin et al. ................ 370/329 |
| 6,138,009 A | * | 10/2000 | Birgerson .................... 455/419 |
| 6,167,255 A | * | 12/2000 | Kennedy et al. .......... 455/414.1 |
| 6,260,078 B1 | * | 7/2001 | Fowlow ....................... 719/332 |
| 6,286,037 B1 | | 9/2001 | Matsuura |
| 6,308,061 B1 | * | 10/2001 | Criss et al. ................... 455/419 |
| 6,347,398 B1 | * | 2/2002 | Parthasarathy et al. ....... 717/178 |
| 6,496,928 B1 | * | 12/2002 | Deo et al. .................... 713/153 |
| 6,643,506 B1 | * | 11/2003 | Criss et al. ................... 455/419 |
| 6,671,509 B1 | * | 12/2003 | Tanaka et al. ................ 455/419 |
| 6,684,198 B1 | | 1/2004 | Shimizu et al. |
| 6,754,894 B1 | * | 6/2004 | Costello et al. .............. 717/169 |
| 6,873,850 B2 | * | 3/2005 | Dowling et al. .......... 455/456.1 |
| 7,054,660 B2 | * | 5/2006 | Lord ............................ 455/558 |
| 7,089,594 B2 | * | 8/2006 | Lal et al. ....................... 726/31 |
| 7,110,752 B2 | * | 9/2006 | Okajima ...................... 455/419 |
| 7,363,622 B2 | * | 4/2008 | Owada ......................... 717/168 |
| 2002/0072355 A1 | * | 6/2002 | Jeong et al. .................. 455/419 |
| 2002/0077094 A1 | * | 6/2002 | Leppanen .................... 455/420 |
| 2003/0022663 A1 | * | 1/2003 | Rajaram et al. .............. 455/419 |
| 2003/0054833 A1 | * | 3/2003 | Hayduk ....................... 455/456 |
| 2004/0018831 A1 | * | 1/2004 | Majmundar et al. ......... 455/419 |
| 2004/0038692 A1 | * | 2/2004 | Muzaffar ..................... 455/502 |
| 2004/0102195 A1 | * | 5/2004 | Naghian et al. .......... 455/456.1 |
| 2004/0152457 A1 | * | 8/2004 | Goldstein et al. ............ 455/419 |
| 2005/0022182 A1 | * | 1/2005 | Mittal .......................... 717/178 |
| 2006/0009205 A1 | * | 1/2006 | Hirata .......................... 455/420 |
| 2006/0184934 A1 | * | 8/2006 | Karlberg ...................... 717/178 |

FOREIGN PATENT DOCUMENTS

| | | | |
|---|---|---|---|
| EP | 0 709 760 A2 | | 5/1996 |
| EP | 0 804 046 A2 | | 10/1997 |
| EP | 959635 A1 | * | 11/1999 |
| GB | 2 313 981 A | | 12/1997 |
| JP | 08212065 A | * | 8/1996 |
| JP | 10-198566 A | | 7/1998 |
| JP | 10-301788 A | | 11/1998 |
| JP | 11-85499 A | | 3/1999 |
| WO | WO 98/57482 | | 12/1998 |

OTHER PUBLICATIONS

Wolfgang Klingenberg, et al., "Using a Hybrid DAB/GSM Communication System to Provide Interactive Multimedia Services to Mobile Users", Proc. of the WPMC '98, Nov. 1998, pp. 104-109, Yokosuka, Japan.

Matthias Unbehaun, "Multimedia Environment for Mobiles Terminal Technology and Transmission", Proc. of ACTS Mobile Communication Summit '96, Nov. 1996, pp. 842-849, vol. II, Granada, Spain.

Thomas Lauterbach, et al., "Multimedia Environment for Mobiles (MEMO)-Interactive Multimedia Services to Portable and Mobile Terminals", Proc. of the ACTS Mobile Communications Summit '97, Oct. 1997, pp. 581-586, Aalborg, Denmark.

* cited by examiner

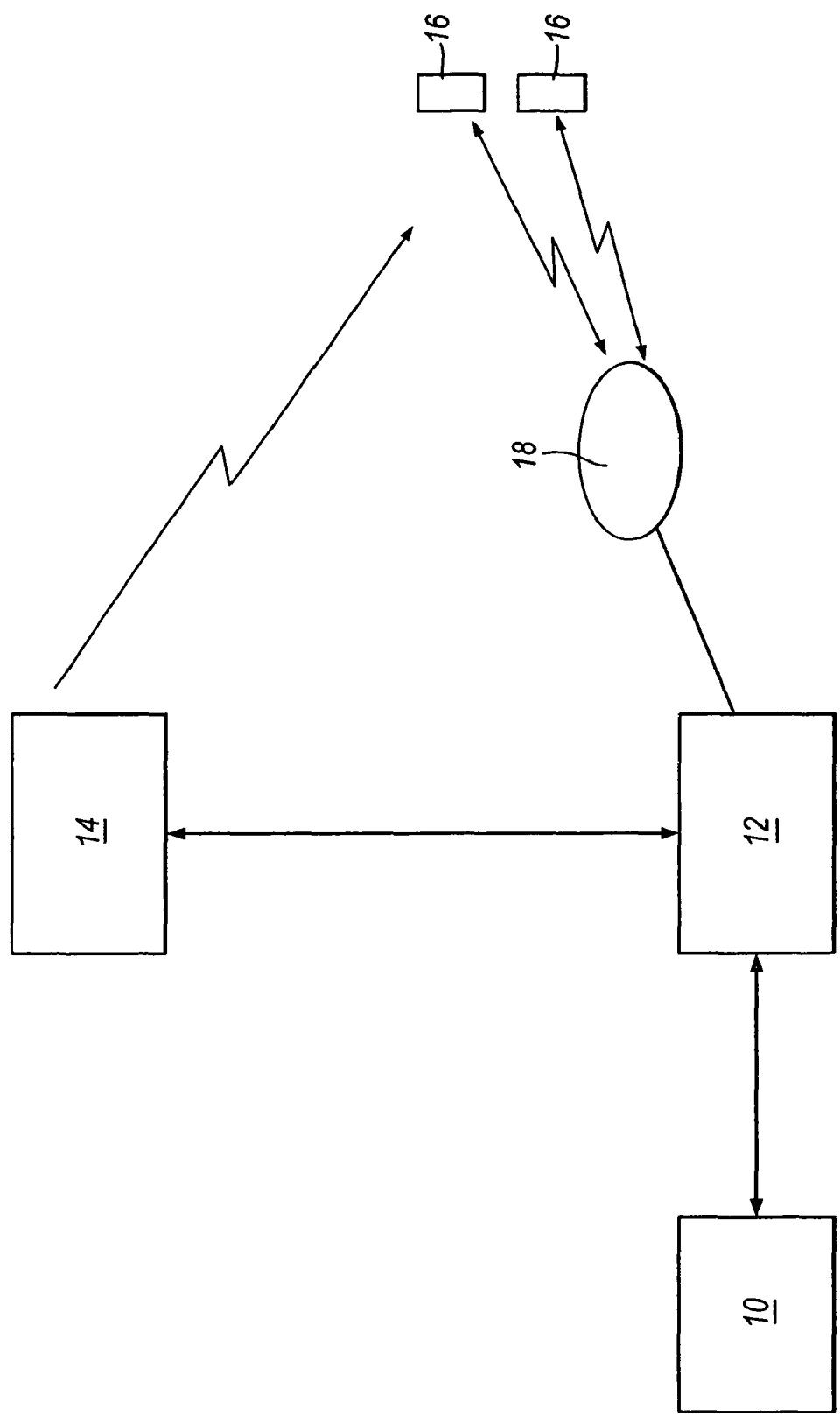

METHOD FOR DOWNLOADING SOFTWARE

BACKGROUND OF THE INVENTION

More specifically, the present invention relates to a method for downloading software to a mobile telecommunications device.

The use of mobile telecommunications and its importance is rapidly increasing in both the private and business sectors. In an effort to attract new customers and to keep existing customers, network operators try to offer a variety of service options. Ideally, network operators would like to be able to introduce new services quickly and to have these services unique to their own networks.

Currently, network operators offer services such as voicemail, address books and up to date information such as stock market quotations. A user selects which services he wants when he chooses his network operator and phone. Other services may be added by contacting his network operator. Services such as stock market quotations are provided by a point to point connection with his network operator. Payment for these services is via the established Global System Mobile (GSM) infrastructure and is reflected on a monthly bill.

SUMMARY OF THE INVENTION

The present invention offers a solution to the problem of introducing new services to customers quickly and efficiently.

According to the present invention, there is provided a method for downloading software to a mobile telecommunications device said method including the steps of: broadcasting said software, receiving and downloading said software to said mobile telecommunications device, contacting a network operator responsible for said broadcasting, and causing said network operator to enable said software such that said software is available for use by a user of said mobile telecommunications device.

According to an aspect of the present invention said step of broadcasting said software is in digital form.

According to a further aspect of the present invention said step of contacting a network operator responsible for said broadcast is via an existing point to point connection.

According to a further aspect of the present invention said step of causing said network operator to enable said software includes a further step of billing said user for said software via said existing point to point connection.

According to yet a further aspect of the present invention said step of contacting a network operator responsible for said broadcast is via an existing GSM connection.

According to a further aspect of the present invention said software is developed using a platform independent object code.

According to yet a further aspect of the present invention said platform independent object code is Java™.

Advantageously, the present invention provides a method whereby mobile network operators can make new services and updated versions of existing services available to existing customers quickly and easily without the need to seek and obtain regulatory permission.

BRIEF DESCRIPTION OF THE DRAWINGS

While the principal advantages and features of the present invention has been described above a greater understanding and appreciation of the invention may be obtained by referring to the drawing and detailed description in the preferred embodiment, presented by way of example only, in which;

FIG. 1 is a block diagram that illustrates the method according to the present invention.

In FIG. 1, in which a preferred embodiment of the present invention is depicted in block diagram form, a software provider 10 is shown which has a commercial agreement with a network operator 12. The software provider designs and writes application software suitable for use with mobile telecommunications devices such as mobile phones or Personal Digital Assistants (PDAs). The software might be a new service such as voicemail systems or an applications type software package such as a word processor or a spreadsheet. The software might also be information such as a street map or the location of hospitals or police stations.

In this preferred embodiment of the present invention the software is developed using a platform independent object code thus enabling the same software to be used by a wide variety of mobile telecommunications devices. In this preferred embodiment the software is developed using the existing commercially available Java™ language. The software is written as Java™ classes capable of running on a Java™ virtual machine.

The software provider 10 enters a commercial agreement with a network operator 12 to sell or license its software to the network operator either on a fixed price, pay-per-use or other suitable payment scheme.

In order to distribute the software to its existing customers, the network operator 12 enters into a commercial agreement with a broadcaster 14. In this preferred embodiment the broadcaster is a digital broadcaster. A digital broadcaster 14 broadcasts the software using a digital broadcasting platform such as Digital Audio Broadcasting (DAB) or Digital Video Broadcasting (DVB) as a means for delivering the Java™ classes to existing network subscribers 16 of the network operator 12. As will be appreciated by those skilled in the art the existing network subscribers may be using a variety of mobile communication devices such as mobile phone or PDAs.

After downloading the Java™ class of interest, the subscriber 16 then contacts the network operator 12 via a base station 18 to establish a point to point contact with the network operator. In this preferred embodiment the point to point contact is via an existing GSM link. The network operator 12 then transmits an authentication code to the subscriber 16 via a GSM base station 18 which enables the Java™ class software to run. Upon transmission of the authentication code the network operator also arranges for the subscriber to be charged for the service on his monthly bill.

As will be appreciated the method of charging may be on a subscription basis or a pay-per-use basis. The billing information can be contained in the downloaded Java™ class broadcast by the digital broadcaster or can be sent with the authentication code via the point to point contact established between the mobile telecommunications device and the network operator via the existing GSM link.

As will be appreciated by those skilled in the art the point to point contact for authorisation and billing purposes can be established via an existing mobile telecommunication protocol such as GSM. Alternatively, the point to point contact can be established via a third generation wireless telecommunications protocol such as Universal Mobile Terminal System (UMTS).

In the previously described embodiment of the present invention all Java™ classes are continuously broadcast over the air by the digital broadcaster. If, for example, a relatively modest data broadcast rate of 9,600 bits per second is used, then 100 services each containing 10,000 bytes of data can be fully broadcast approximately every 14 minutes. As will be appreciated, other broadcast rates could be used without departing from the scope of the present invention. New services can then be downloaded to the subscriber's mobile telecommunications device allowing the subscriber to have access to new services on demand.

In an alternative embodiment of the present invention the digital broadcaster continuously broadcasts a list of services available more frequently than the actual services themselves. The subscriber can then view the list via his mobile telecommunications device and decide which services he wants to download. The list may appear in a menu type format. Information can be encoded in a list of services such that when a particular service is selected the mobile telecommunications device automatically downloads that service the next time it is broadcast. This embodiment enables the list to be received by the subscriber more rapidly than the actual services. Once the service of interest is selected the subscriber is free to do other things while the service is automatically downloaded the next time it appears in the broadcast cycle.

In a further embodiment certain high demand services would be broadcast more often in a broadcast cycle than other services of lesser demand. Alternatively, certain priority services would be automatically downloaded immediately upon broadcast, provided sufficient memory is available on the mobile telecommunications device.

An example of a typical operation of a preferred embodiment of the present invention will now be given. The subscriber selects the option on his mobile phone to view the list of services currently available from his network operator. This list, which is continuously broadcast appears on his phone's display screen. The subscriber selects the service that he is interested in using. In response to the subscriber's selection, the phone then listens for the relevant Java™ class to be broadcast. When the phone detects the selected Java™ class the software is downloaded and installed. The menu entries now indicate that the service is loaded and available for use. The subscriber can now choose to enable the service. Upon selecting the enabling option an authentication conversation is initiated between the phone and the network operator. The network operator then sends an authorisation code to the subscriber and arranges for the subscriber to be billed for the service. The authorisation may be on a subscription of pay-per-use basis. The subscriber is now able to use the selected service.

As will be appreciated by those skilled in the art, various modifications may be made to the embodiment hereinbefore described without departing from the scope of the present invention.

As will be appreciated other mobile telecommunications devices then a phone can be used, such as PDA's or Global Positioning Systems (GPS), and are hereby incorporated within the scope of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for a mobile telecommunications network operator distributing software to a mobile telecommunications device that is an existing subscriber of said network operator, said method including the steps of:

said network operator providing mobile telecommunications service to said mobile telecommunications device via a mobile telecommunications network;

said network operator causing a broadcaster, different from the network operator, to broadcast application, service or information software;

said mobile telecommunications device receiving and downloading said software;

a user of said mobile telecommunications device contacting said network operator via the mobile telecommunications service provided by said network operator; and said network operator enabling said software via said mobile telecommunications service, such that said software is available for use by a user of said mobile telecommunications device.

2. The method as claimed in claim 1, wherein said step of broadcasting said software is implemented in digital form.

3. The method as claimed in claim 1, wherein said step of broadcasting includes continuously broadcasting said software.

4. The method as claimed in claim 1, wherein:

said step of broadcasting also includes broadcasting a list of software available more frequently than the software is broadcast.

5. The method as claimed in claim 1, wherein said step of broadcasting includes broadcasting certain high demand software more often in a broadcast cycle than other software for which there is lesser demand.

6. The method as claimed in claim 1, wherein said step of contacting a network operator responsible for said broadcast is via an existing point to point connection.

7. The method as claimed in claim 6, wherein said step of causing said network operator to enable said software includes a further step of billing said user for said software via said existing point to point connection.

8. The method as claimed in claim 6, wherein said step of contacting a network operator responsible for said broadcast is via an existing Global System Mobile connection.

9. The method as claimed in claim 1, wherein said software is developed using a platform independent object code.

10. The method as claimed in claim 9, wherein said platform independent object code is Java™.

11. The method according to claim 1, wherein said software comprises a program for performing an application or service.

12. The method according to claim 11, wherein said broadcaster broadcasts said program independently of any request from said mobile telecommunications device.

13. The method according to claim 12, wherein said mobile telecommunications device receives said program from said broadcaster, without participation of said network operator in said broadcast.

14. The method according to claim 11, wherein said enabling of said program comprises said network operator sending a signal which activates said program, whereby it becomes capable of performing said application or service.

15. The method according to claim 1, wherein said broadcast of said software is performed continuously via a digital broadcasting platform or digital video broadcasting, directly from said broadcaster to said mobile telecommunications device.

16. The method according to claim 1, wherein said enabling of said software is performed by a communication from said network operator to said telecommunications device via a communication channel different from a communication channel by which said telecommunication device receives said broadcast software from said broadcaster.

* * * * *

UNITED STATES PATENT AND TRADEMARK OFFICE
CERTIFICATE OF CORRECTION

| | | |
|---|---|---|
| PATENT NO. | : 7,826,834 B2 | Page 1 of 1 |
| APPLICATION NO. | : 09/959496 | |
| DATED | : November 2, 2010 | |
| INVENTOR(S) | : Michael Hook | |

It is certified that error appears in the above-identified patent and that said Letters Patent is hereby corrected as shown below:

Title Page, Item (22) should read as follows:

-- (22) PCT Filed:     Feb. 16, 2000 --.

Signed and Sealed this
Nineteenth Day of April, 2011

David J. Kappos
*Director of the United States Patent and Trademark Office*